(No Model.)
H. BOLDT.
MACHINE FOR DIVIDING DOUGH.
No. 511,499. Patented Dec. 26, 1893.
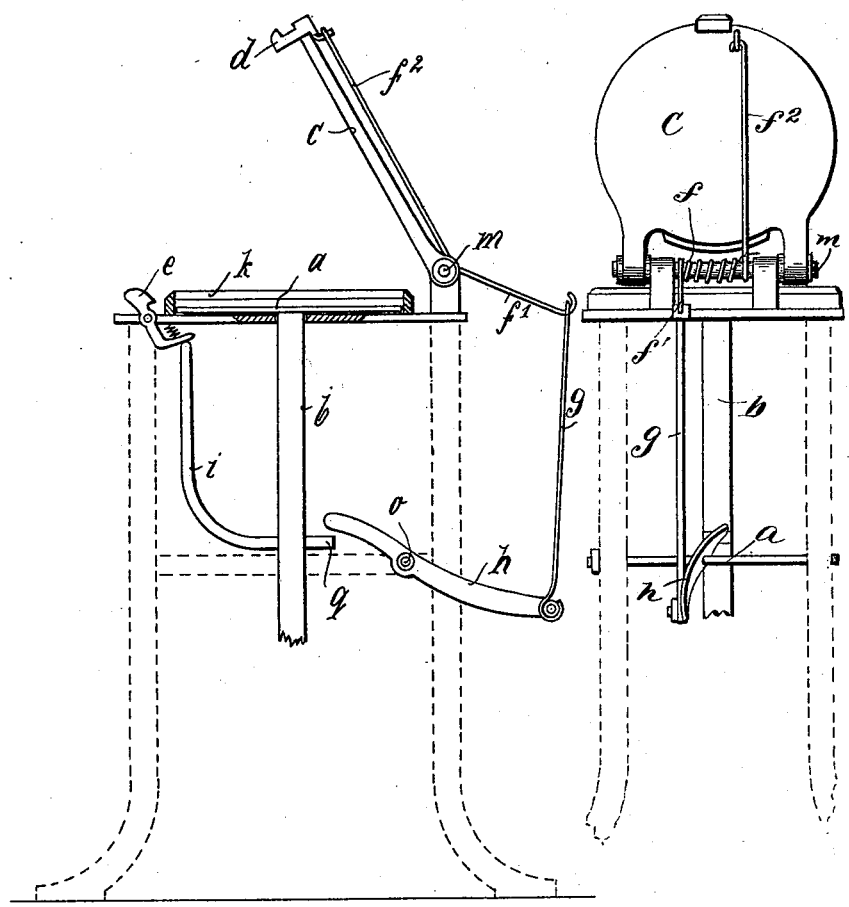
Witnesses:
Arthur Walther
Emil Kayser
Inventor:
Heinrich Boldt
by [signature]
Attorneys.
THE NATIONAL LITHOGRAPHING COMPANY,
WASHINGTON, D. C.

UNITED STATES PATENT OFFICE.

HEINRICH BOLDT, OF BERLIN, GERMANY.

MACHINE FOR DIVIDING DOUGH.

SPECIFICATION forming part of Letters Patent No. 511,499, dated December 26, 1893.

Application filed March 11, 1893. Serial No. 465,618. (No model.) Patented in Germany April 29, 1892, No. 67,695.

*To all whom it may concern:*

Be it known that I, HEINRICH BOLDT, a subject of the King of Prussia, German Emperor, and a resident of Berlin, in the Kingdom of Prussia, German Empire, have invented certain new and useful Improvements in Machines for Dividing Dough, (for which I have obtained a patent in Germany, No. 67,695, dated April 29, 1892,) of which the following is an exact specification.

My invention relates to improvements in machines for dividing dough, in which a stretched spring operates in connection with a check-mechanism; and the objects of my improvement are, first, to lift and close the cover automatically, and, second, to disengage automatically the check-mechanism. I attain these results by the mechanism illustrated in the accompanying drawings, in which—

Figure 1 is a side view, and Fig. 2 is a back view of a machine for parting dough.

The parts of the machine not necessary for a clear understanding of this specification are shown in dotted lines, or are omitted.

Similar letters refer to similar parts in both views.

The table $a$, serving for the reception of the dough, is moved by the rod $b$, within the casing $k$, the latter being covered by the cover $c$, turning on the shaft $m$, round which is wound loosely the spiral spring $f$, one end of which $f^2$, is rigidly connected to the cover $c$, while the other end $f'$ is connected by the link $g$, to one end of the side lever $h$, fulcrumed at the fixed point $o$, of the frame. The check-mechanism is of usual construction, and consists of the hook $e$, catching in the projection $d$ of the cover $c$ and disengaged at due time by the arm $i$, connected to the rod $b$.

The operation is as follows: The machine being in the position designated, the dough is placed on the table, the rod $b$, moved downward by means of levers, or by any other means known, enables the free end of the side-lever $h$ to go down, the other end of the side lever, the link $g$ and the end $f'$ of the spring $f$ to move upward; the spring $f$ thus relaxes and the cover $c$ slowly falls down on account of its weight; thereby the hook $e$ catches in the projection $d$ of the cover $c$, and holds the cover in the closed position. The dough on the table $a$ being divided, in order to remove it, the rod $b$ is moved upward, engaging with its pin or tappet $q$, the free end of the side-lever $h$, the end $f'$ of the spring being drawn downward by the link $g$, thus stretching the spring $f$, which tends to lift the cover; but the cover can not be lifted until the arm $i$, touches the hook $e$ and disengages it from the projection $d$. After the closing mechanism has been disengaged, the cover is jerked upward, and takes the position shown in Fig. 1, where its weight is balanced by the force of the spring $f$.

It is of great importance, for the quiet and regular working of the machine, that the arm $i$ shall disengage the hook $e$ at that time, the spring $f$ having already been sufficiently stretched, to be able to overcome the weight of the cover. My mechanism therefore largely differs from all other mechanisms existing for the same purpose, where either the lifting or closing of the cover or the disengaging of the check-mechanism are made by hand; while in my invention everything as the lifting or closing of the cover and the disengaging of the check-mechanism are made automatically, without any manipulation from the assisting laborer being required, who can thus direct his whole attention to the parting of the dough or to moving the rod. It is not necessary, for the spring to be attached directly to the cover; it may be attached to the shaft $m$, which must then be rigidly connected to the cover $c$. The spring also can be arranged in any other known manner, causing the cover to be lifted or to fall down, the spring only being respectively sufficiently stretched or relaxed.

Having thus fully described the nature of this invention, what I claim, and desire to secure by Letters Patent of the United States, is—

In a machine for dividing dough, the combination with a movable hook $e$ upon the frame of the machine, another hook $d$ rigidly attached to the cover $c$, the rod $b$ secured to the table $a$, and arm $i$, fastened to said rod $b$, adapted to disengage the hook $e$ from hook $d$, and a pin $q$ rigidly attached to said rod, a lever $h$ pivoted to the frame of the machine and adapted to be operated by the pin $q$, of a spiral-spring $f$, one end of which is attached to the cover, and the other end of which is secured to one end of the lever $h$, for the purpose set forth.

In testimony whereof I have signed this specification in the presence of two subscribing witnesses.

HEINRICH BOLDT.

Witnesses:
R. HERPICH,
H. GENEHR.